United States Patent [19]

Cunningham

[11] 4,097,557

[45] Jun. 27, 1978

[54] METHOD OF PREPARING BLOCK POLYMERS

[75] Inventor: Robert E. Cunningham, Akron, Ohio

[73] Assignee: The Goodyear Tire & Rubber Company, Akron, Ohio

[21] Appl. No.: 385,915

[22] Filed: Aug. 6, 1973

[51] Int. Cl.² ............................................. C08F 297/04
[52] U.S. Cl. ................................................. 260/880 B
[58] Field of Search ............... 260/93.5 R, 880 B, 879

[56] References Cited

U.S. PATENT DOCUMENTS

| 3,029,221 | 4/1962 | Welch | 260/93.5 |
| 3,070,574 | 12/1962 | Kasting et al. | 260/93.5 |
| 3,641,205 | 2/1972 | LaFlair | 260/880 |
| 3,819,767 | 6/1974 | Shimomura | 260/880 B |

FOREIGN PATENT DOCUMENTS

| 888,624 | 1/1962 | United Kingdom. | |
| 1,189,767 | 4/1970 | United Kingdom | 260/880 B |
| 1,191,605 | 5/1970 | United Kingdom | 260/880 B |

*Primary Examiner*—Paul R. Michl
*Attorney, Agent, or Firm*—J. Y. Clowney

[57] ABSTRACT

There is disclosed an improved method of preparing ABC block polymers, wherein A is α-methylstyrene, B is a conjugated diene, and C is styrene or a substituted styrene.

7 Claims, No Drawings

METHOD OF PREPARING BLOCK POLYMERS

This invention relates to an improved method of preparing block polymers. More specifically, this invention relates to an improved method of preparing block polymers of (A) α-methylstyrene, (B) a conjugated diene, and (C) styrene or a substituted styrene.

Prior art methods of preparing ABC type block polymers have been described. In some, a "living" polystyrene is formed and used to initiate the diene, thus forming a diblock. After the diene is copolymerized, the diblock viscous cement is cooled and α-methylstyrene is added to the living diblock polymer, along with a polar compound to accelerate polymerization and polymerization is continued below 15° C.

The present invention offers several advantages over the prior art methods. In the present invention, one addition step is eliminated, thus reducing the chance of contamination. In prior art methods stirring of the viscous diblock polymer at low temperatures is difficult. In the present invention the need to cool the viscous cement of the diblock polymer is eliminated. Also the polar compounds used in the prior art methods would be inoperative in the present invention since they would randomize the copolymerization block.

The use of alkali metals as initiators to make "living polymers" has been described in the prior art for the preparation of certain block polymers. In the present invention, monolithium alkyls are utilized as the initiators to make the "living" polymers.

By the term "living polymers" is meant that the polymerization has no termination or transfer reactions so that the polymer chains have lithium atoms attached to the chain end when all the monomer is consumed. If additional monomer is added, the polymerization will continue with the new monomer adding on to the already existing chains until it is consumed.

According to the invention, then, an improved method of preparing ABC block polymers of (A) α-methylstyrene, (B) a conjugated diene, and (C) styrene or a substituted styrene, the improvement being polymerizing the (A) α-methylstyrene with an organolithium initiator to form a "living" polymer and then adding a mixture of (B) a conjugated diene and (C) styrene or a substituted styrene to form an ABC block polymer.

The initiators which are useful for this invention are organolithium compounds. The organo component of the initiator may be an alkyl, aryl, cycloalkyl, alkaryl or arylalkyl group. Representative of some compounds which can be utilized in this invention are n-butyl lithium, 2-butyl lithium, phenyl lithium, cyclohexyl lithium, tolyl lithium, naphthyl lithium, secondary hexyl lithium and the like. The initiators themselves are not the thrust of this invention, so that any organolithium compound with catalytic activity would be within the scope and spirit of this invention.

The amount of organolithium initiator used in the practice of this invention cannot be specifically set down since the amount of initiator used depends on the molecular weight of polymer desired and the purity of the organolithium initiator. What can be said is that a catalytic amount is necessary for polymerization. As a general rule, the molecular weight of the polymer is equal to the grams of polymer formed, divided by the moles of initiator employed. Thus, one skilled in the art can adjust the catalyst level and monomer amount to get any desired molecular weight polymer.

The blocks of the polymer may have different molecular weights depending upon a specifically desired physical or chemical characteristic of the final product. For example, the molecular weight of the polystyrene block may vary so that an increased polystyrene molecular weight will impart a stiffness to the resulting block polymer. Not only does the molecular weights of the individual blocks have an effect on the final block polymer, but also the weight ratios between the individual blocks affect the properties of the final polymer. For example, if the polystyrene block comprises a majority of the polymer, then the product would have a plastic character as opposed to a rubbery character.

In the present invention, the polystyrene block and the poly-α-methylstyrene block molecular weights can be from about 10,000 to about 40,000 and the poly(conjugated diene) block can be from about 40,000 to about 150,000. A more preferred range of molecular weights would be from about 15,000 to about 30,000 for the polystyrene block and the poly-α-methylstyrene block. A more preferred range for the poly(conjugated diene)-block would be from about 40,000 to about 80,000.

Although preferred ranges are set down in this invention, this is not to preclude other molecular weights of the blocks, and also not to preclude other weight ratios of the blocks to be within the scope and spirit of this invention. The preferred ranges set down within this specification are only for the type of rubbery block polymer for which the final polymers will be utilized and are not to be used as a restriction on the scope of this invention.

The conjugated dienes which can be utilized in this invention are those that are already known in the prior art. The conjugated dienes which can be utilized in the practice of this invention may be either straight or branched chain. The conjugated dienes preferably have from 4 to 10 carbon atoms. Representative of the conjugated dienes that can be utilized are 1,3-butadiene, isoprene, 1,3-pentadiene, 2,3-dimethyl butadiene, 1,3-hexadiene, 2-methyl-1,3-octadiene and the like.

Styrene as well as some of the alkyl substituted styrenes may be utilized in this invention. Representative of the alkyl substituted styrenes which can be utilized in this invention are vinyl toluenes, p(t-butyl)styrene, p(ethyl)styrene and the like.

The temperature at which the polymerizations of this invention may be conducted is not critical. The temperature may range from about −20° to about 100° C.

The pressure employed is usually ambient but may be either higher or lower.

The invention is further illustrated by reference to the following examples which are representative of the invention and are in no way intended to limit the invention.

The polymerization conditions and techniques should be those characterized as air and moisture-free so as not to hinder the polymerization reactions. These techniques are well known to one skilled in the art. The polymerizations are usually conducted in the presence of a solvent. The polymerizations may be run in any of the known aliphatic and aromatic hydrocarbon solvents as long as they do not adversely affect the polymerization rate or the final product. Representative of such solvents are toluene, benzene, pentane, hexane, cyclohexane and the like.

EXAMPLE I

A solution was prepared from 33½ grams (37½ ml) of α-methylstyrene and 63½ grams (74 ml) of toluene. It was passed through a silica gel column and 90 ml of the solution were placed in a bottle and capped. This solution was chilled to −17° C., sparged thoroughly with nitrogen and initiated with 5 ml of 0.20 M sec-butyllithium dietherate (sec-BuLi·2 Et₂O); this allows 0.5 ml of the organolithium solution to act as a scavenger to react with impurities in the solution. Thus, 21 ml of the α-methylstyrene solution contain 1.0 ml of the 0.20 M sec-butyllithium dietherate solution. The bottle was capped with a perforated metal cap lined with a self-sealing rubber gasket and maintained at −17° C. for 3 days.

A solution was made up to contain 4 grams of styrene and 12 grams of butadiene per 80 ml of solution, with benzene as the solvent. It was passed through a silica gel column and charged to a bottle. The solution was sparged 15 seconds with nitrogen and 0.35 ml of the 0.20 M sec-butyllithium dietherate solution was added to scavenge impurities. This was allowed to react for 10 seconds, then 22 ml of the "living" poly-α-methylstyrene solution described above were added. The bottle was tightly capped and tumbled in a water bath at 50° C. It became deep red in 3 hours and was removed from the bath after a total of 4 hours. It was coagulated in methanol containing some phenolic antioxidant. After soaking in additional methanol and antioxidant and drying in vacuo at −50° C., polymer yield was 18.9 grams. The polymer had a DSV in toluene at 30° C. of 1.07, and was found by UV spectroscopic analysis to contain 17 percent (by weight) of α-methylstyrene and 22 percent (by weight) of styrene. The molecular weights were about 16,000 for the poly-α-methylstyrene block, about 21,000 for the polystyrene block and about 58,000 for the polybutadiene block. The polymer had a tensile strength at 75° F. of 4200 psi with 700 percent elongation, and at 212° F. the tensile strength was 329 psi with 920 percent elongation.

EXAMPLE II

A solution was prepared from 38 ml of α-methylstyrene and 76 ml of toluene. It was passed through a silica gel column and 100 ml were placed in a bottle, chilled, and 4.5 ml of 0.20 M sec-butyllithium dietherate were added. This allows 0.50 ml of the sec-butyllithium dietherate solution to act as a scavenger for reaction with impurities in the solution. Hence, 20.8 ml of the α-methylstyrene solution now contain 0.8 ml of the sec-butyllithium dietherate solution. The bottle was capped with a perforated metal cap lined with a self-sealing rubber gasket and allowed to react at −17° C. for 6 days. At this time, it was found that 21 ml of this solution contained 4.2 grams of poly-α-methylstyrene.

A solution was prepared to contain 6 grams of styrene and 12 grams of butadiene per 80 ml of solution, with benzene as the solvent. It was passed through a silica gel column and charged to a bottle. The solution was sparged 15 seconds with nitrogen and 0.35 ml of the sec-butyllithium dietherate solution (above) was added to scavenge impurities. After allowing this to react for 10 seconds, 21 ml of the "living" poly-α-methylstyrene solution (above) were added. The bottle was capped and tumbled for about 6 hours in a water bath at 50° C., then stored at 5° C. for 16 hours. After standing about 5 hours at 25° C., the dark red cement was coagulated in methanol containing a phenolic antioxidant. After drying in vacuo at 50° C., 20.5 grams of polymer were obtained. This polymer had a DSV in toluene at 30° C. of 1.16, and was found by UV spectroscopic analysis to contain 20 percent (by weight) of α-methylstyrene and 30 percent (by weight) of styrene. The molecular weights were about 26,000 for the poly-α-methylstyrene block, about 38,000 for the polystyrene block and about 66,000 for the polybutadiene block. The polymer had a tensile strength at 75° F. of 4600 psi with 775 percent elongation, and at 212° F. the tensile strength was 705 psi with 800 percent elongation.

EXAMPLE III

A solution was prepared from 38 ml (34½ grams) of α-methylstyrene and 73 ml (62½ grams) of toluene, passed through a silica gel column and 100 ml were then placed in a bottle. The solution was chilled, sparged thoroughly with nitrogen, and 5.5 ml of 0.20 M solution of sec-butyllithium dietherate were added. This allows 0.5 ml of the organolithium solution to react with possible impurities in the solution. The bottle was sealed with a perforated metal cap lined with a self-sealing rubber gasket and allowed to stand at −17° C. for 7 days. At the end of this time, it was found that 15 ml of this solution contained 2.95 grams of poly-α-methylstyrene.

A solution was prepared to contain 3 grams of styrene and 9 grams of butadiene per 80 ml of solution, using benzene as the solvent. It was passed through a silica gel column and placed in a bottle. The solution was sparged 15 seconds with nitrogen and 0.35 ml of the 0.20 M sec-butyllithium dietherate solution was added to scavenge impurities in the solution. After allowing this to react for 10 seconds, 15 ml of the "living" poly-α-methylstyrene solution (above) were added, and the bottle was capped and tumbled in a water bath at 50° C. for 3 hours. They were then stored at 25° C. for about 64 hours. Cement was coagulated in methanol containing a phenolic antioxidant and the polymer was dried in vacuo at about 50° C. Yield was 15.1 grams of a polymer which had a DSV in toluene at 30° C. of 1.94. It was found by UV spectroscopic analysis that the polymer contained 19 percent (by weight) of α-methylstyrene and 15 percent (by weight) of styrene. The molecular weights were about 19,000 for the poly-α-methylstyrene block, about 15,000 for the polystyrene block and about 66,000 for the polybutadiene block. It had a tensile strength at 75° F. of 2500 psi with 770 percent elongation, and at 212° F. the tensile strength was 440 psi with 900 percent elongation.

EXAMPLE IV

A solution was prepared from 61 ml (55 grams) of α-methylstyrene and 113 ml (98 grams) of toluene. It was passed through a silica gel column and 165 ml were placed in a bottle. It was sparged thoroughly with nitrogen and 7.0 ml of 0.20 M sec-butyllithium dietherate were added. This allows for 0.40 ml of the organolithium solution to react with impurities in the solution. The bottle was capped with a perforated metal cap lined with a self-sealing rubber gasket and allowed to stand at −17° C. for 8 days. At the end of this time 15 ml of this solution were found to contain 3.56 grams of poly-α-methylstyrene.

A solution was prepared to contain 3 grams of styrene and 9 grams of butadiene per 70 ml of solution, using benzene as the solvent. It was passed through a silica gel column and charged to a bottle. The solution was sparged 15 seconds with nitrogen and 0.35 ml of 0.20 M sec-butyllithium dietherate was added to scavenge impurities. After allowing this to react for 10 seconds, 15 ml of the "living" poly-α-methylstyrene solution (above) were added. The bottle was capped and tumbled in a water bath at 50° C. for about 16 hours. The cement was then coagulated in methanol containing some phenolic antioxidant; then the polymer was dried in vacuo at about 50° C. Yield was 15.0 grams of a polymer which had a DSV in toluene at 30° C. of 1.71. It was found by UV spectroscopic analysis to contain 23 percent (by weight) of α-methylstyrene and 17 percent (by weight) of styrene. The molecular weights were about 28,000 for the poly-α-methylstyrene block, about 22,000 for the polystyrene block and about 75,000 for the polybutadiene block. The polymer had a tensile strength at 75° F. of 2610 psi with 580 percent elongation, and at 212° F. tensile strength was 800 psi with 730 percent elongation.

While certain representative embodiments and details have been shown, for the purpose of illustrating the invention, it will be apparent to those skilled in this art that various changes and modifications may be made therein without departing from the spirit or scope of the invention.

What is claimed is:

1. A method of preparing block polymers under solution polymerization conditions at temperatures from about −20° C to about 100° C, consisting of contacting (A) α-methyl styrene with an organo monolithium initiator to form a living polymer of poly-α-methyl styrene having a molecular weight from about 10,000 to about 40,000, subsequently adding a mixture consisting essentially of (B) a conjugated diene and (C) vinyl aromatic compound selected from the group consisting of styrene, vinyl toluene, p-(t-butyl)styrene and p-(ethyl)styrene, to form an ABC block polymer in which the molecular weight of the poly-α-methyl styrene block ranges from about 10,000 to about 40,000, the polyconjugated diene block ranges from about 40,000 to about 150,000 and the polyvinyl aromatic block ranges from about 40,000 to about 150,000.

2. The method of preparing block polymers according to claim 1 wherein the lithium catalyst is selected from the group consisting of n-butyl lithium, secondary butyl lithium, phenyl lithium, cyclohexyl lithium, tolyl lithium, naphthyl lithium and secondary hexyl lithium.

3. The method of preparing block polymers according to claim 1 wherein the conjugated dienes have from 4 to 10 carbon atoms.

4. The method of preparing block polymers according to claim 1 wherein the conjugated diene is selected from the group consisting of 1,3-butadiene, isoprene, 1,3-pentadiene, 2,3-dimethyl butadiene, 1,3-hexadiene and 2-methyl-1,3-octadiene.

5. The method of preparing block polymers according to claim 1 wherein the substituted styrene is selected from the group consisting of vinyl toluenes, p-tertiary butyl styrene and p-ethyl styrene.

6. The method of preparing block polymers according to claim 1 wherein the A-block is poly-α-methylstyrene, the B-block is polybutadiene and the C-block is polystyrene.

7. The method of preparing block polymers according to claim 1 wherein the lithium catalyst is secondary butyl lithium, the A-block is poly-α-methylstyrene, the B-block is polybutadiene and the C-block is polystyrene.

* * * * *